United States Patent
Parsoneault

(10) Patent No.: US 6,771,461 B2
(45) Date of Patent: Aug. 3, 2004

(54) SPINDLE HUB HAVING A BACK IRON MOUNTINGLY COUPLED TO ONLY A HUB SEPARATING MEMBER

(75) Inventor: Norbert Steven Parsoneault, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 42 days.

(21) Appl. No.: 10/262,216

(22) Filed: Sep. 30, 2002

(65) Prior Publication Data

US 2003/0235007 A1 Dec. 25, 2003

Related U.S. Application Data

(60) Provisional application No. 60/390,387, filed on Jun. 21, 2002.

(51) Int. Cl.[7] ................................................. G11B 17/02
(52) U.S. Cl. ..................................................... 360/99.08
(58) Field of Search ........................... 360/98.07, 99.04, 360/99.08

(56) References Cited

U.S. PATENT DOCUMENTS 5,091,809 A * 2/1992 Connors et al. .......... 360/99.08
5,212,607 A * 5/1993 Elsing et al. ............. 360/99.08

* cited by examiner

*Primary Examiner*—A. J. Heinz
(74) *Attorney, Agent, or Firm*—Raghunath S. Minisandram; Jesus Del Castillo

(57) ABSTRACT

The present invention is related to a disk drive hub/back iron configuration that resists distortion upon changinging temperature of the disk drive. The hub/back iron configuration thus prevents distortion of the disks, reducing HDI problems.

20 Claims, 4 Drawing Sheets

SPINDLE HUB HAVING A BACK IRON MOUNTINGLY COUPLED TO ONLY A HUB SEPARATING MEMBER

This application claims priority to U.S. Provisional Application Serial No. 60/390,387, filed Jun. 21, 2002; entitled, "Spindle Hub With Uniform Thermal Distortion"; Attorney docket number STL 3185. The foregoing patent application, which is assigned to the assignee of the present application, is incorporated herein by reference in its entirety.

BACKGROUND OF THE INVENTION

Computer information is often written to and read from a rotating recording medium. The data is recorded in concentric tracks of a magnetic disk in the form of magnetic transitions. The disks are mounted on a spindle and the information is accessed by an actuator which moves a magnetic transducer radially over the surface of the disk and aligns the transducers with the concentric tracks. The disk and spindle are mounted for rotation on a support shaft and the disks are rotated at high speeds by means of an electric motor.

Important requirements for magnetic disk files are quick access to data together with a high data rate. A key to both is high rotational speed of the disks. On average, it takes a half of a rotation of a disk for the desired data to reach the transducer after the actuator has positioned the transducer at the desired track. Thus, the higher the speed the disk rotates, the quicker the desired data can be accessed. Similarly, faster rotation of a disk causes more data to pass the transducer, increasing the data rate at the transducer.

Increased capacity is also important and has been accomplished by increasing both the data density per disk and the number of disks in a given space. The number of disks able to occupy a given space has been increased by packing the disks closer together.

The combination of higher spindle speeds and the increased number of disks has resulted in increasing the operating temperatures of high capacity, high performance disk drives. The changing temperature has a compounding effect in that increased temperature of the rotor reduces the motor efficiency and increases resistivity, thereby increasing the temperature even further due to the increased winding resistance.

Spindle motors with separate rotor assemblies and stator assemblies are commonly used for disk drive applications. The rotor generally carries a multi-polar magnet, which is mounted about a lower periphery of the rotor. The stator typically includes a radially-oriented magnet, with the polarity of areas of the magnet alternated based on the location of the multi-polar magnet in the rotor. The multi-polar magnet responds to the alternating magnetic field to rotate the rotor and disks.

In a typical assembly of a separate rotor/stator configuration, the stator is mounted to a disk drive base plate, and the rotor assembly is mounted to bearings that are, in turn, mounted about a cylindrically shaped shaft.

Various components of the rotor/stator assembly include the rotor shaft, bearings, a sleeve, a hub, the stator and stator magnet, a back iron, as well at least one disk. The increases in temperature in the disk environment may effect all components of the rotor/stator assembly. Moreover, the increases in temperature may affect the way in which the components are placed in relation to each other or interact with each other, as the various components are made of differing materials with different coefficients of expansion. Indeed, differing extents of thermal expansion in adjacent parts can distort the rotor/stator assembly as well as the disks, causing head/drive interface (HDI) problems.

Thus, it is of interest in the art to develop a rotor/stator assembly that undergoes decreased distortion at high temperatures.

SUMMARY OF THE INVENTION

An object of the present invention is to provide a hub and back iron assembly for a disk drive with decreased distortion during times of temperature change. Thus, the present invention provides a hub and back iron assembly for a disk drive, where the disk drive has a spindle and at least one disk, comprising: an annular hub having an inner side wall proximate the spindle; an outer side wall proximate the disk or disks; a top surface; and a bottom surface. The bottom surface has at least two notches—inner and outer notches—defined by a separating member. The inner notch accommodates a stator and the outer notch accommodates a back iron. In addition, the separating member has an outer sidewall. The hub and back iron assembly also includes a back iron disposed within the outer notch of the hub. The back iron has an inner surface proximate the spindle and coupled to the outer surface of the separating member of the hub, and an outer side wall proximate to the at least one disk and not coupled to the outer side wall of the hub. The coupling of the hub to the back iron may be accomplished by any number of means, including, but not limited to, gluing or press fitting.

In addition, the present invention provides a disk drive comprising: a base; a spindle; an annular hub having an inner side wall proximate the spindle; an outer side wall proximate the at least one disk; a top surface; and a bottom surface having inner and outer notches defined by a separating member. The inner notch accommodates a stator, the outer notch accommodates a back iron. Further, the separating member has an outer sidewall. In addition, the disk drive includes a back iron disposed within the outer notch of the hub, where the back iron has an inner surface proximate the spindle and coupled to the outer surface of the separating member of the hub, and an outer side wall proximate to the at least one disk and not coupled to the outer side wall of the hub. Further, the disk drive includes a shaft supporting at least one end of the annular hub; a fluid dynamic bearing system comprising fluid in a gap between the shaft and the sleeve and the annular hub and the sleeve; a stator; and a cover adapted to couple with the base.

DETAILED DESCRIPTION OF THE INVENTION

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disc drive which is illustrated. On the contrary, the invention is intended to cover alternatives, modifications and equivalents that may be included within the spirit and scope of the invention as defined by the attached claims. Further, hard disc drives are well known to those of skill in this field. In order to avoid confusion while enabling those skilled in the art to practice the claimed invention, this specification omits such details with respect to known items.

Figure 1:
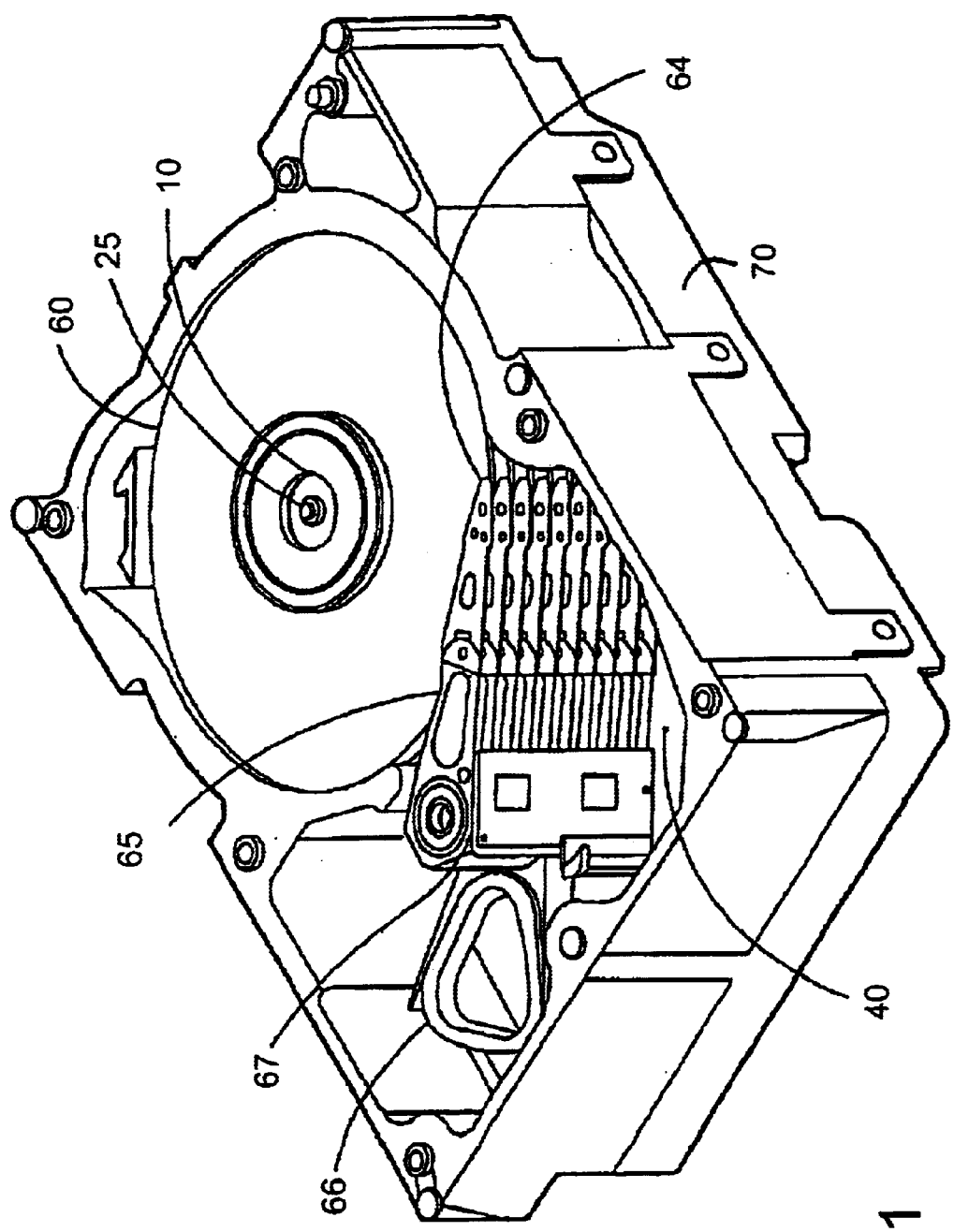
FIG. 1 is a top view representation of a magnetic disk drive.

FIG. 1 illustrates an example of a magnetic disk drive in which the invention may be employed. At least one magnetic disk 60 having a plurality of concentric tracks for recording information is mounted on a spindle 10. The spindle is mounted on spindle support shaft 25 for rotation about a central axis. As the disks are rotated by the motor, a transducer 64 mounted on the end of an actuator end 65 is selectively positioned by a voice coil motor 66 rotating about a pivot axis 67 to move the transducer 64 from track to track across the surface of the disk 60. The elements of the disk drive are mounted on base plate 40 in a housing 70 that is typically sealed to prevent contamination (a top or cover of housing 70 is not shown). The disks 60 are mounted on spindle 10.

Figure 2:
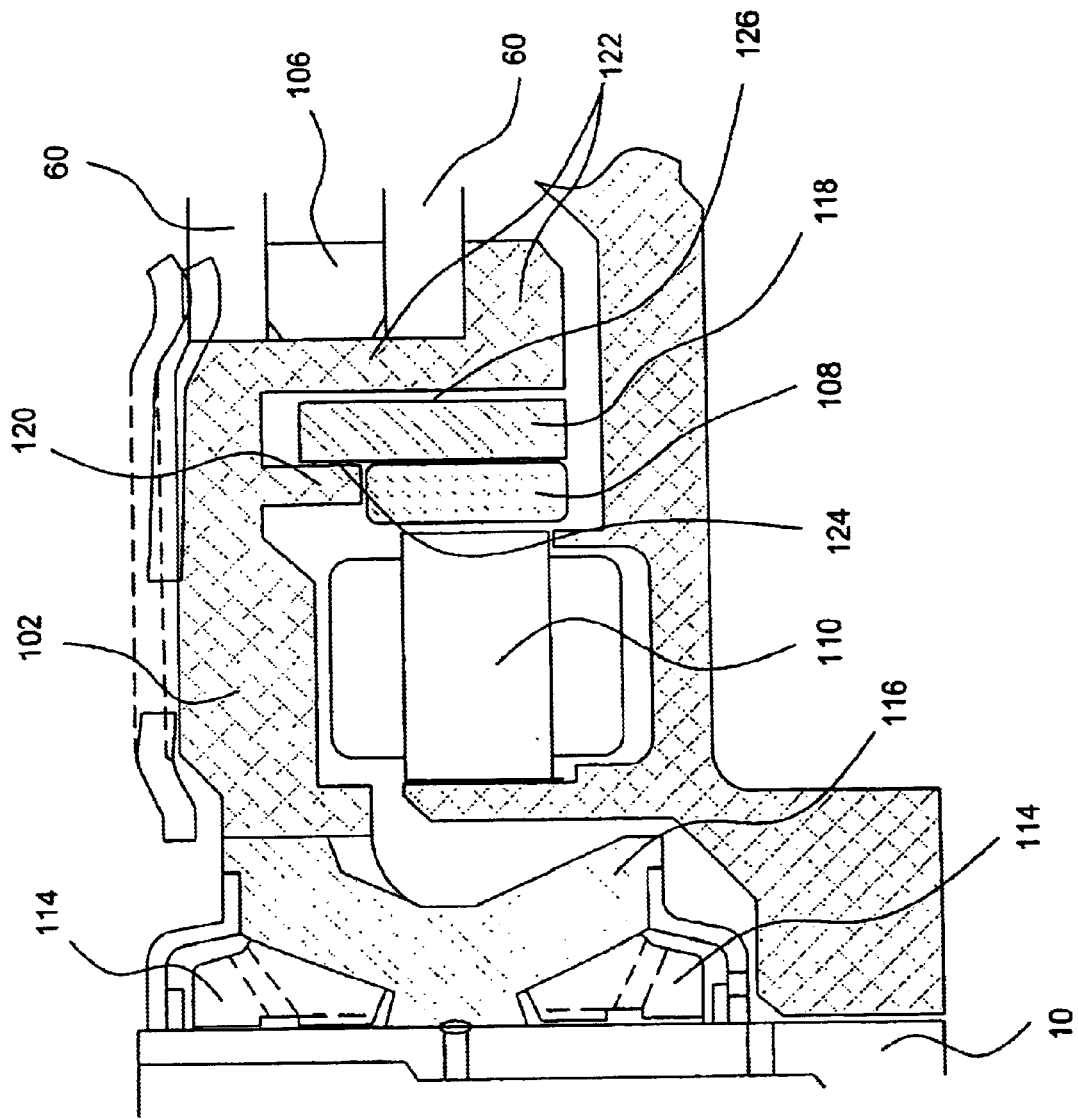
FIG. 2 is a cross-sectional illustration of a hub, back iron and magnet assembly.

FIG. 2 is a cross section of an exemplary hub, back iron and magnet assembly. The disk drive is comprised of hub 102, which inludes a separating member 120 and a region 122, disks 60, spacer 106 and magnet 108. Magnet 108 is, at its top adjacent to separating member 120, at its outside edge adjacent to back iron 118, and at its inside edge adjacent to the stator assembly 110. FIG. 2 additionally shows a sleeve 116 coupled to a spindle 10, and fluid dynamic bearing cones 114. Back iron 118 has an inner surface 124 and an outer surface 126. Regions or surface of components proximate the spindle 10 are referred to as inner or inside, and regions or surfaces of components proximate the disks 60 are referred to as outer or outside.

The thermal expansion of hub 102 at its outer diameter at region 122 must closely match the thermal expansion of the disks 60. As the back iron is typically glued, shrunk, or pressed against hub 102, the interaction of back iron 118 with hub 102 changes how the hub outer diameter at region 122 expands. In prior art configurations, the outer region 126 of back iron 118 is joined to the inner surface of region 122 of hub 102. In such a prior art configuration, any expansion in the hub outer diameter ar region 122 tends to distort disks 60, and such distortion of disks 60 leads to HDI problems. A prior art version of the attachment of back iron 118 of hub 102 is shown in FIG. 3.

In the present invention, and as shown in FIG. 2, back iron 118 is coupled to hub 102 only at the upper region of the inner surface 124 of back iron 118 and the outer surface of the separating member 120 of hub 102. Such coupling can be done by means known in the art, including using glues or other adhesives, press fitting or other coupling means. Back iron 118 is not coupled to hub 102 at the outer surface 126 of back iron 118. Since the coupling of back iron 118 to hub 102 is at a junction distal to disks 60, any distortion or configuration change in back iron 118 is unlikely to affect, or at the least will have less effect on, disks 60.

EXAMPLE

Figure 3:
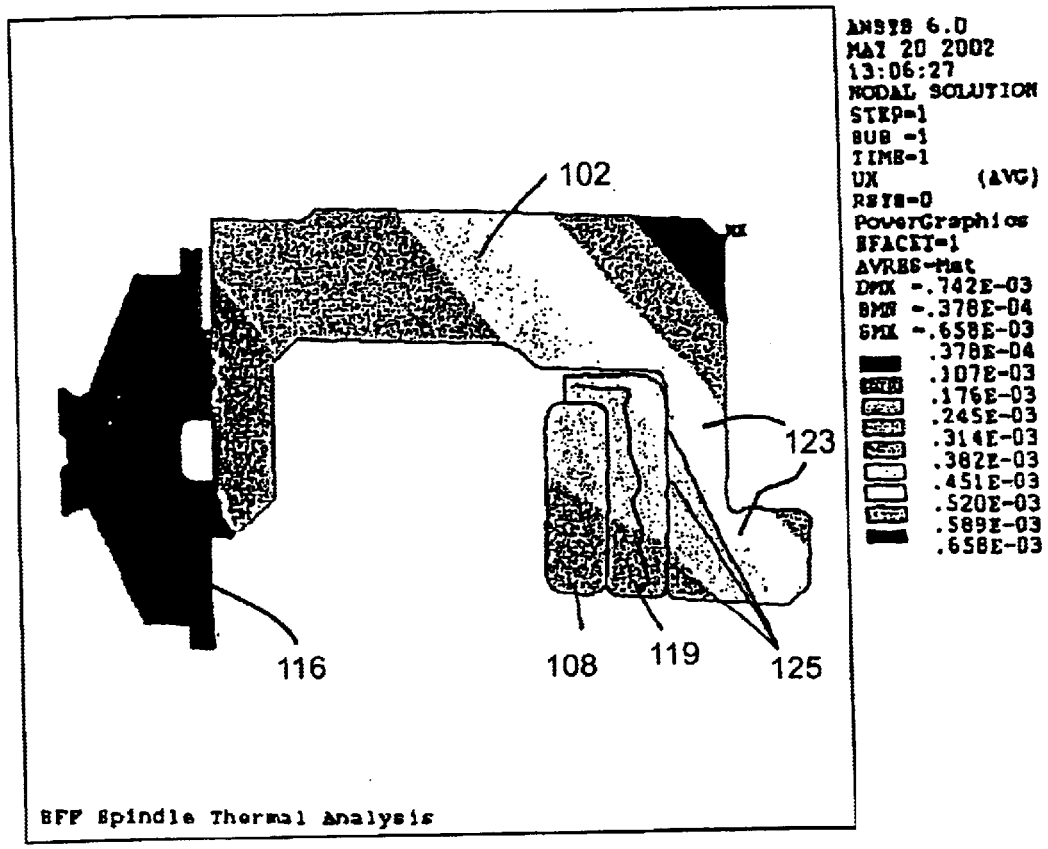
FIG. 3 is a cross-sectional illustration of a prior art hub, back iron and magnet assembly.

FIG. 3 illustrates a prior art hub, back iron and magnet assembly. In this figure, there is a sleeve 116, hub 102, magnet 108, and back iron 119. Note that the configuration of back iron 119 is that of an upside down "L", and that region 123 of hub 102 contacts back iron 119 along area 125. In this configuration, and in any configuration where the back iron is coupled to the outer wall of the hub, distortion in the back iron 119 would affect region 123 of hub 102. Region 123 is that region of hub 102 that is adjacent to the disks (not shown). Thus, the distortion caused by back iron 119 of hub region 123 would affect the disks (not shown). The shading of the hub/back iron/magnet assembly in FIG. 3 shows expansion as a result of heating. If the expansion of the assembly were uniform, the shading would be in vertical "stripes". The angle shows that the top of the hub is moving more than the bottom of the hub with increasing temperature. Note that the hub area 123 (typically composed aluminum) coupled to the back iron (typically composed of steel) has several shadings—indicative of uneven expansion.

Figure 4:
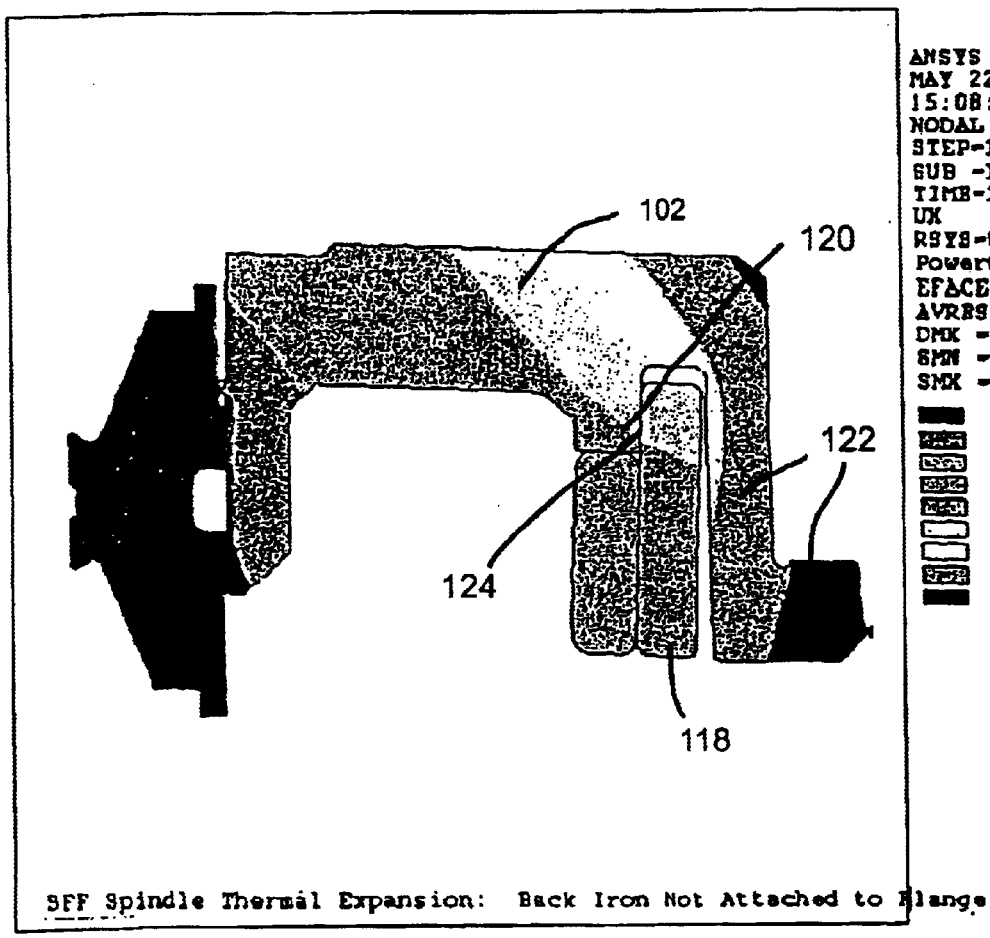
FIG. 4 is a cross-sectional illustration of an embodiment of a hub, back iron and magnet assembly according to the present invention.

FIG. 4 shows an embodiment of the hub, back iron and magnet configuration of the present invention. Note that the configuration of hub 102 and back iron 118 has been changed from the prior art. Note that back iron 118 is not attached to hub region 122. Instead, back iron 118 is attached to the inner surface of separating member 120 at junction 124. In this configuration, back iron 118, when distorted, affects separating member 120 of hub 102, not region 122 of hub 102. Thus region 122, the region of the hub adjacent the disks (not shown), is not affected by distortion of back iron 118. The shading of the hub/back iron/magnet assembly in FIG. 4 shows expansion as a result of heating similar to that in FIG. 3. However, note that, though still angled, there are not as many varying areas of differential expansion. In FIG. 4, the hub area 123 (typically composed aluminum) coupled to the back iron (typically composed of steel) has only two shadings and that the majority of hub area 123 is only one shade.

What is claimed is:

1. A hub and back iron assembly for a disk drive, where the disk drive has a spindle and at least one disk, comprising:

an annular hub having an inner side wall proximate the spindle; an outer side wall proximate the at least one disk; a top surface; and a bottom surface having inner and outer notches with a separating member therebetween, wherein the inner notch accommodates a stator, the outer notch accommodates a back iron and the separating member has an outer sidewall; and a back iron disposed within the outer notch of the hub, wherein the back iron has an inner surface proximate the spindle and coupled to the outer surface of the separating member of the hub, and an outer side wall proximate to the at least one disk and not coupled to the outer side wall of the hub.

2. The hub and back iron assembly of claim 1, further comprising a shaft, a sleeve and fluid bearing for the shaft to support rotation relative to the sleeve.

3. The hub and back iron assembly of claim 1, wherein the separating member of the hub is shorter than the outer side wall of the hub.

4. The hub and back iron assembly of claim 1, further comprising a stator disposed within the inner notch of the hub.

5. The hub and back iron assembly of claim 4, wherein a permanent magnet is disposed beneath the separating member and between the stator and the back iron.

6. The hub and back iron assembly of claim 1, wherein the back iron is coupled to the hub by glue.

7. The hub and back iron assembly of claim 1, wherein the back iron is coupled to the hub by a press fit.

8. A disk drive comprising:

a base;

a spindle;

an annular hub having an inner side wall proximate the spindle; an outer side wall proximate the at least one disk; a top surface; and a bottom surface having inner and outer notches with a separating member therebetween, wherein the inner notch accommodates a stator, the outer notch accommodates a back iron and the separating member has an outer sidewall; and a back iron disposed within the outer notch of the hub, wherein the back iron has an inner surface proximate the spindle and coupled to the outer surface of the separating member of the hub, and an outer side wall proximate to the at least one disk and not coupled to the outer side wall of the hub;

a shaft supporting at least on end of the annular hub and adjacent a sleeve;

a stator; and a cover adapted to couple with the base.

9. The disk drive of claim 8, further comprising a fluid bearing for the shaft to support rotation relative to the sleeve.

10. The disk drive of claim 8, wherein the separating member of the hub is shorter than the outer side wall of the hub.

11. The disk drive of claim 8, wherein the stator is disposed within the inner notch of the hub.

12. The disk drive of claim 11, wherein a magnet is disposed beneath the separating member and between the stator and the back iron.

13. The disk drive of claim 8, wherein the back iron is coupled to the hub by glue.

14. The disk drive of claim 8, wherein the back iron is coupled to the hub by a press fit.

15. A disk drive comprising:

a base;

a shaft supporting on one end an annular hub;

a sleeve adjacent the shaft;

the annular hub having an inner side wall proximate the sleeve; an outer side wall proximate the at least one disk; a top surface; and a bottom surface having inner and outer notches with a separating member therebetween, wherein the inner notch accommodates a stator, the outer notch accommodates a back iron and the separating member has an outer sidewall; and a back iron disposed within the outer notch of the hub, wherein the back iron has an inner surface proximate the shaft and coupled to the outer surface of the separating member of the hub, and an outer side wall proximate to the at least one disk and not coupled to the outer side wall of the hub;

a stator; and a cover adapted to couple with the base.

16. The disk drive of claim 15, wherein the stator is disposed within the inner notch of the hub.

17. The disk drive of claim 16 wherein a magnet is disposed beneath the separating member and between the stator and the back iron.

18. The disk drive of claim 15, wherein the back iron is coupled to the hub by glue.

19. The disk drive of claim 15, wherein the back iron is coupled to the hub by a press fit.

20. The disk drive of claim 15, further comprising a fluid dynamic bearing system comprising fluid in a gap between the shaft and the sleeve and the annular hub and the sleeve.

* * * * *